US007225443B2

(12) United States Patent
Lake (10) Patent No.: US 7,225,443 B2
(45) Date of Patent: May 29, 2007

(54) STACK USAGE IN COMPUTER-RELATED OPERATING SYSTEMS

(75) Inventor: David Lake, Malton (GB)

(73) Assignee: Livedevices Limited (GB)

( * ) Notice: Subject to any disclaimer, the term of this patent is extended or adjusted under 35 U.S.C. 154(b) by 799 days.

(21) Appl. No.: 10/242,482

(22) Filed: Sep. 11, 2002

(65) Prior Publication Data

US 2004/0045003 A1    Mar. 4, 2004

(30) Foreign Application Priority Data

Aug. 28, 2002 (GB) ................................ 0219936.2

(51) Int. Cl.
*G06F 9/46* (2006.01)
*G06F 12/00* (2006.01)
(52) U.S. Cl. ...................... 718/100; 718/103; 718/104; 718/107; 711/1; 711/100
(58) Field of Classification Search ................ 718/100, 718/102–104, 107; 711/1, 5, 100, 147
See application file for complete search history.

(56) References Cited

U.S. PATENT DOCUMENTS

| 3,905,023 A | 9/1975 | Perpiglia |
| 6,240,358 B1 | 5/2001 | Kawai ......................... 701/114 |

FOREIGN PATENT DOCUMENTS

EP        0 052 713    6/1982

OTHER PUBLICATIONS

"Allocation of stack space for interrupt routines"; *IBM Technical Disclosure Bulletin*, 30:2, Jul. 1987, pp. 889-892.

Du et al.; "High-Performance DSPs"; *IEEE Signal Processing Magazine*; Mar. 2000; pp. 16-26.

*Primary Examiner*—Meng-Al T. An
*Assistant Examiner*—Kenneth Tang
(74) *Attorney, Agent, or Firm*—Sheridan Ross PC (57) ABSTRACT

Methods, devices, configuration tools and operating systems are disclosed for reducing memory and processor usage in a computer operating system utilising a processor, a memory and a single stack, the operating system comprising a plurality of tasks divided into predetermined priority categories, including preemptive tasks and at least one task that voluntarily yields control of the processor to tasks of lower priority than itself in predetermined circumstances, wherein each task has associated therewith a stack pointer, and wherein the at least one task, when started, has its stack pointer set to a precalculated worst-case value guaranteed to leave sufficient space in the stack beneath the stack pointer for any preemptive tasks of lower priority, and wherein the at least one task has allocated to it an area of memory into which its stack contents is saved, a size of the area of memory being determined by a declared precalculated worst-case stack usage of the at least one task at any point at which the at least one task may yield control of the processor. Embodiments of the present invention enable a plurality of tasks to run on a single stack, thus saving memory and processor usage.

14 Claims, 5 Drawing Sheets

Single shot tasks imply single stack

Fig. 1
Single shot tasks imply single stack

Fig. 2
Minimizing stack size

Fig. 3
Example of fixed stack locations for tasks that yield voluntarily

Fig. 4
Save areas and resuming tasks that yield control

Fig. 5
Save areas and non-preemption

STACK USAGE IN COMPUTER-RELATED OPERATING SYSTEMS

The present invention relates to methods and systems for reducing memory and processor usage, with particular reference to stack operations, in real-time computing applications. The invention is particularly, though not exclusively, directed towards operating systems that make use of static priority-based scheduling but that also permit tasks explicitly to suspend themselves and/or wait for predetermined events. Embodiments of the present invention are of particular relevance to the technical field of embedded devices and the control thereof, since these generally use static priority-based scheduling given the limited range of functions required.

The present application builds on a number of concepts outlined in the present applicant's copending U.S. patent publication Nos. 2003/0204554 (14th May 2002) and 2003/0204639 (14th May 2002), the full contents of which are hereby incorporated into the present application by reference.

In an operating system that is based around static priority based scheduling (systems in which the priority ordering of tasks is determined offline and remains constant, and in which it is generally guaranteed that the highest-priority runnable task is executing at any given time) there exists some external description of the tasking structure of the system that is used to generate data structures describing the tasks and their priorities. These data structures are most advantageously calculated offline by a "configuration tool" or other program and used to initialise the system when it starts up. Tasks in such an operating system may be activated at any time, but do not start to run until they are the highest-priority runnable task in the system. They may be pre-empted by other higher-priority tasks at which point a context-switch takes place.

In such a system employing solely single-shot "run to completion" tasks, it is possible to exploit a single stack for all tasks (see FIG. 1), where higher priority tasks simply use the stack on top of the task being pre-empted.

Figure 2:
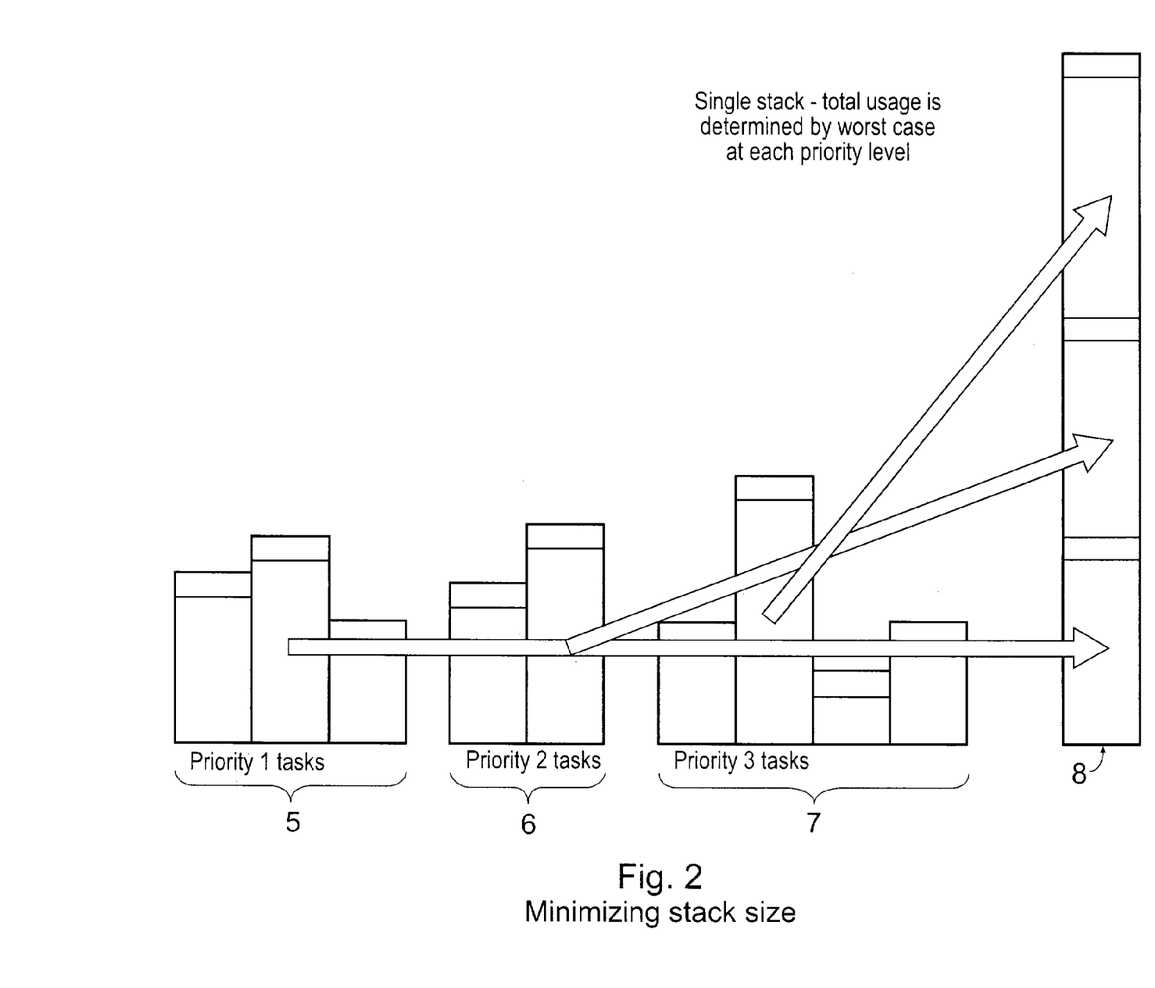
FIG. 2 shows how, in such a system, information about non-preemption between tasks can be used to minimise the amount of stack needed.

Certain groups of tasks may advantageously be placed into "non-preemption groups" such that their priorities are allocated in such a fashion that when any one of the tasks in a non-preemption group is executing, no other task in that group may preemptively gain control of the central processing unit (CPU) (see FIG. 2).

Such operating systems may be extended to permit tasks voluntarily to suspend or yield control of the CPU by way of a well-defined application programmer interface (API). A task may wait for an event to occur and register an interest in being awakened when that event occurs, or may voluntarily suspend its computations in order co-operatively to permit other tasks to use the CPU. Examples of such systems include, but are not limited to, OSEK extended conformance classes ECC1 or ECC2.

In an operating system conforming to OSEK ECC1 or ECC2 or similar in which co-operating multitasking must coexist with preemptive multitasking, it is conventional for each task to be allocated its own stack. This is easy to implement, since any context switch can be achieved simply by switching stacks. The disadvantage, however, is that RAM usage is very high (since a large number of stacks is required), and time is wasted when switching from one stack to another.

It is therefore advantageous to run an operating system on a single stack. However, this can be complicated, since whenever a context switch is made (for example to a task with a higher priority), it is necessary to save the content of the stack to another location and/or to ensure that the existing content of the stack (for example relating to a lower priority task) is not irretrievably overwritten.

Embodiments of the present invention as described seek to provide a means of allocating stack usage on a single stack for such mixed preemptive/cooperating systems.

Applications built using such operating systems typically consist of a plurality of concurrent tasks which may have different priorities. Embodiments of the present invention seek to provide a means of ensuring that an entire mixed pre-emptive/cooperating system can run on a single stack, thus saving RAM and reducing context switch overhead, particularly for pre-emptive tasks, as no switching between stacks is required.

Consider a system in which each task is annotated with its worst-case stack usage figures. In the simplest case, this could be a single number for each task; more advanced variants of this approach can take account of shared priorities, non-preemption between tasks, or transient stack usage (for example during semaphore or interrupt locks), among others.

Figure 1:
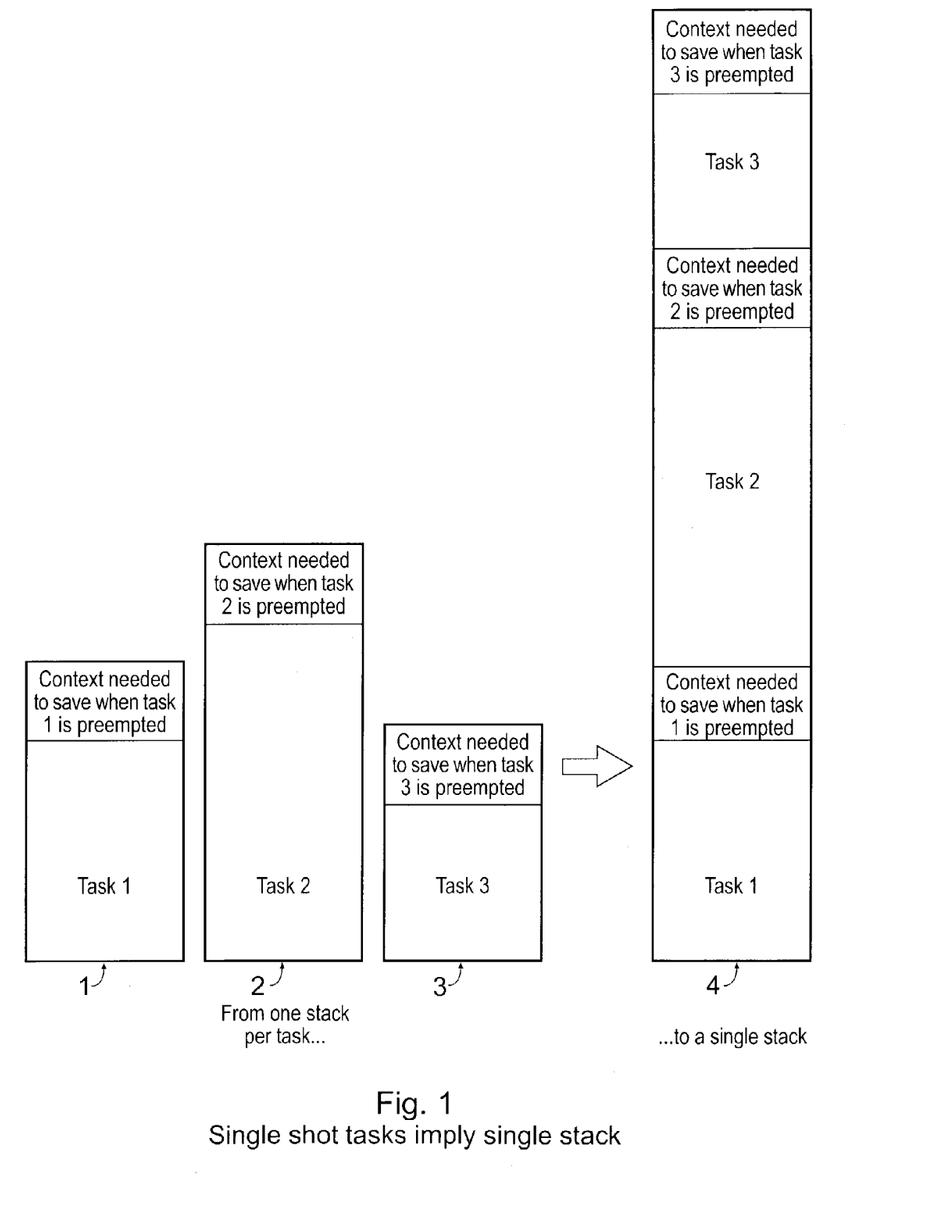
FIG. 1 shows how, in a preemptive system with "single-shot" tasks, a single stack can be used.

The simplest (and very pessimistic) approach to estimating stack usage for a system simply composes the maximum stack usage for each task in priority order (FIG. 1). More sophisticated approaches may also use analysis of non-preemption to permit stack optimisation (FIG. 2)—note how for each group of tasks that are declared off-line in such a way that they cannot preempt one another, stack space is only needed for the largest of the tasks in the relevant non-preemption group.

However, even these more sophisticated approaches do not provide for adequate stack optimisation when tasks that voluntarily yield control of the CPU are implemented (for example, tasks that need to wait for a user or other input at some point during implementation must yield control of the CPU until the user or other input is received, otherwise the system as a whole will unnecessarily come to a halt), because additional action is required in order to continue to run on a single stack.

Tasks that do not voluntarily yield control of the CPU do not need to save and restore their stack—under normal preemption they stack up in whatever order the preemption takes place and are unstacked when the task terminates. When a task voluntarily yields control of the CPU, some action is required in order to continue to run on a single stack.

In particular, off-line analysis of the tasks and their stack usage can be used to determine the worst case stack-usage of all tasks that can run at lower priority than any task that can voluntarily yield control of the CPU. Such a task can then be started with its initial stack pointer set to this value and it can be sure that it is not overwriting the stack area of any lower priority task. When and if the task subsequently yields control of the CPU, the amount of stack used from the start point to the yield point can be saved into a separate statically allocated area from where it can later be restored when the task regains control.

According to a first aspect of the present invention, there is provided a method of reducing memory and processor usage in a computer operating system utilising a processor, a memory and a single stack, the operating system comprising a plurality of tasks divided into predetermined priority categories, including preemptive tasks and at least one task that voluntarily yields control of the processor to tasks of lower priority than itself in predetermined circumstances, wherein each task has associated therewith a stack pointer, and wherein the at least one task, when started, has its stack pointer set to a precalculated worst-case value guaranteed to leave sufficient space in the stack beneath the stack pointer for any preemptive tasks of lower priority, and wherein the at least one task has allocated to it an area of memory into which its stack contents is saved, a size of the area of memory being determined by a declared precalculated worst-case stack usage of the at least one task at any point at which the at least one task may yield control of the processor.

According to a second aspect of the present invention, there is provided a configuration tool for reducing memory and processor usage in a computer operating system utilising a processor, a memory and a single stack, the operating system comprising a plurality of tasks divided into predetermined priority categories, including preemptive tasks and at least one task that voluntarily yields control of the processor to tasks of lower priority than itself in predetermined circumstances, wherein each task has associated therewith a stack pointer, and wherein the tool is adapted to calculate a worst-case stack pointer value for the at least one task guaranteed to leave sufficient space in the stack beneath the stack pointer for any preemptive tasks of lower priority than the at least one task and wherein the tool is adapted to allocate to the at least one task an area of memory into which the stack contents of the at least one task is saved, a size of the area of memory being determined by a declared worst-case stack usage, calculated by the tool, of the at least one task at any point at which the at least one task may yield control of the processor.

According to a third aspect of the present invention, there is provided a computing device programmed with a configuration tool for reducing memory and processor usage in a computer operating system utilising a processor, a memory and a single stack, the operating system comprising a plurality of tasks divided into predetermined priority categories, including preemptive tasks and at least one task that voluntarily yields control of the processor to tasks of lower priority than itself in predetermined circumstances, wherein each task has associated therewith a stack pointer, and wherein the tool is adapted to calculate a worst-case stack pointer value for the at least one task guaranteed to leave sufficient space in the stack beneath the stack pointer for any preemptive tasks of lower priority than the at least one task, and wherein the tool is adapted to allocate to the at least one task an area of memory into which the stack contents of the at least one task is saved, a size of the area of memory being determined by a declared worst-case stack usage, calculated by the tool, of the at least one task at any point at which the at least one task may yield control of the processor.

The configuration tool may be in the form of a software product. The software product may be in any appropriate form or language, and may be stored on a data carrier such as a floppy disk, optical disk, flash memory device or any other type of data carrier.

According to a fourth aspect of the present invention, there is provided a computer operating system utilising a processor, a memory and a single stack, the operating system comprising a plurality of tasks divided into predetermined priority categories, including preemptive tasks and at least one task that voluntarily yields control of the processor to tasks of lower priority than itself in predetermined circumstances, wherein each task has associated therewith a stack pointer, and wherein the at least one task, when started, has its stack pointer set to a precalculated worst-case value guaranteed to leave sufficient space in the stack beneath the stack pointer for any preemptive tasks of lower priority, and wherein the at least one task has allocated to it an area of memory into which its stack contents is saved, a size of the area of memory being determined by a declared precalculated worst-case stack usage of the at least one task at any point at which the at least one task may yield control of the processor.

According to a fifth aspect of the present invention, there is provided a computing device programmed with an operating system utilising a processor, a memory and a single stack, the operating system comprising a plurality of tasks divided into predetermined priority categories, including preemptive tasks and at least one task that voluntarily yields control of the processor to tasks of lower priority than itself in predetermined circumstances, wherein each task has associated therewith a stack pointer, and wherein the at least one task, when running, has its stack pointer set to a precalculated worst-case value guaranteed to leave sufficient space in the stack beneath the stack pointer for any preemptive tasks of lower priority, and wherein the at least one task has allocated to it an area of memory into which its stack contents is saved, a size of the area of memory being determined by a declared precalculated worst-case stack usage of the at least one task at any point at which the at least one task may yield control of the processor.

By way of embodiments of the present invention, it is possible to determine worst-case stack use for all tasks in an operating system in order to identify the worst-case stack usage (and hence the worst-case initial stack pointer) for tasks that may voluntarily yield control of the processor (e.g. a CPU).

Each task that may voluntarily yield control of the processor (otherwise known as a cooperative task, in contrast to a preemptive task) needs:

i) On activation, to set the stack pointer to the calculated worst-case value (this is guaranteed to leave at least enough space "under" the task for any purely-preemptive tasks of lower priority).

ii) To have allocated to it an area to store its own stack in, of size determined by its declared worst case stack usage at any point at which it may yield—it may yield control to another task whose stack would ordinarily occupy the same area of memory (the tasks might be in a non-preemption group). This area may be allocated statically by the configuration tool.

Any operating system functions that may cause a task voluntarily to yield control of the processor must be implemented in such a way that on detecting the need to yield they cause the current stack pointer and stack between the task's known base stack pointer and the current stack pointer value to be saved into this area, and on returning control to the task cause the stack to be restored from the "save area" and the stack pointer to be set to its previous value. It is also to be noted that when suspending a cooperative task and resuming a preemptive task, the stack pointer from the purely preemptive tasks running at lower priorities than the cooperative task must be restored.

It is to be appreciated that embodiments of the present invention find particular utility in the technical field of embedded devices and the control thereof since these generally use static priority-based scheduling given the limited range of functions required. In other words, the various tasks and their characteristics can be predefined statically and off-line in embedded device applications, since these are generally predictable, closed systems rather than large systems requiring dynamic task definitions.

The configuration process to calculate stack characteristics for the cooperative tasks ran be carried out according to the following pseudo code, which is set forth by way of example only. The existence is assumed of a function to calculate the worst-case stack usage for a given set of tasks running up to a given priority level, since this is established technology.

```
for t in Tasks do
    if t is cooperative then
        empty preempt_set
        for p in tasks do
            if t can preempt p then
                add p to preempt_set
            end if
        end for
        need_stack_adjustment (t,true)
        start_stack (t) =
            worst_case_stack (preempt_set, priority (t) )
        reserve_save_area(t, stack_on_suspend (t) )
    else
        need_stack_adjustment (t, false)
    end if
end for
```

In addition to this offline configuration activity, it is necessary to perform additional run-time operations to copy from/to stack save areas when context switching to and from cooperative tasks occurs. Preemptive tasks incur no additional run-time operations, because they are not constrained in the area of stack that they must use. A means of achieving this per-task variation in behaviour at low runtime cost can be found in the present applicant's co-pending UK patent application no 0209800.2—sub-dispatchers as described therein can easily be constructed to perform the necessary copy for cooperative tasks.

For a better understanding of the present invention and to show how it may be carried into effect, reference shall now be made by way of example to the accompanying drawings, in which.

FIG. 1 shows a conventional arrangement in which three single-shot tasks (Task 1, Task 2 and Task 3) are each provided with an independent stack 1, 2, 3. Each stack 1, 2, 3 must include enough memory to store its respective task and also to store any associated context when that task is preempted. It is possible to run all three tasks on a single stack 4 by reserving enough memory in the stack 4 for each task and its associated context to be stored one on top of the other. The stack 4 must reserve more RAM than will generally be required in real-life applications, because this scenario assumes a simple "worst case" scenario.

FIG. 2 shows an alternative conventional arrangement in which tasks are grouped into non-preemption groups each having a given priority. Specifically, there is a non-preemption group 5 of tasks having priority 1; a non-preemption group 6 of tasks having priority 2; and a non-preemption group 7 of tasks having priority 3. Because no task may preempt any other task within the same non-preemption group 5, 6 or 7, it is possible to run all of the tasks on a single stack 8 by reserving enough space for the largest task (and its associated context) in each non-preemption group 5, 6 and 7 in the stack 8 as shown.

Figure 3:
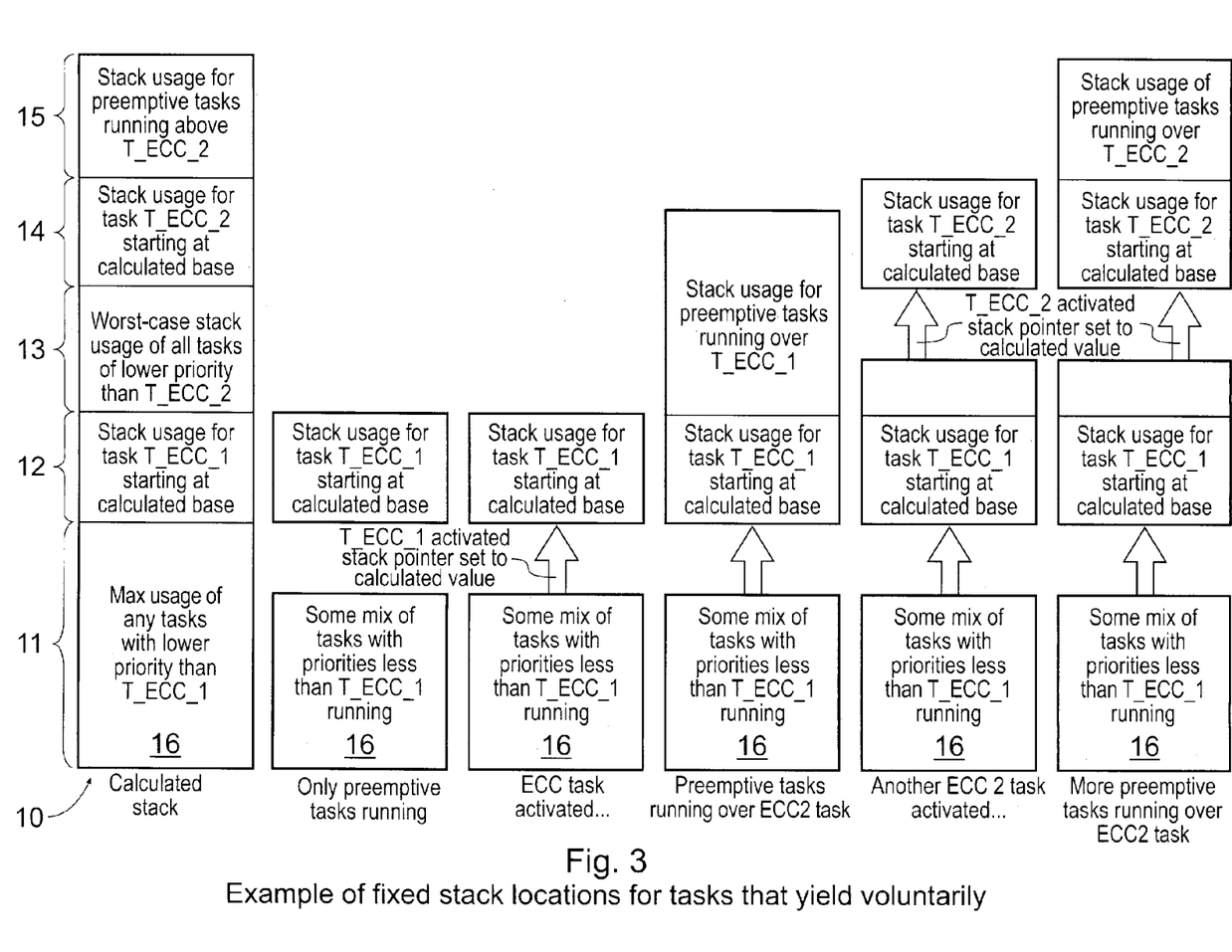
FIG. 3 shows how, for two tasks that voluntarily yield control of the processor (cooperative), each has its stack pointer uniquely determined.

FIG. 3 illustrates an embodiment of the present invention where two tasks (T_ECC_1 and T_ECC_2) that voluntarily yield control of the processor (cooperative), may have their stack pointers uniquely determined. The calculated single stack is shown at 10, and is built up as follows. Firstly, the maximum usage of any tasks with priority lower than task T_ECC_1 is determined and space 11 is reserved therefor in the stack 10. Secondly, the stack usage for task T_ECC_1 is determined and space 12 reserved in the stack 10 on top of space 11. Thirdly, the worst-case usage of all tasks with priority lower than task T_ECC_2 is determined and space 13 is reserved therefor in the stack 10 on top of space 12. Fourthly, the stack usage for task T_ECC_2 is determined and space 14 reserved in the stack 10 on top of space 13. Finally, stack usage for preemptive tasks running above task T_ECC_2 is calculated and space 15 reserved therefor on top of space 14. The calculations may be undertaken by the configuration tool of embodiments of the present invention.

The operation of this embodiment of the present invention is also illustrated in FIG. 3. When only preemptive tasks are running, for example some mix of tasks 16 with priority less than task T_ECC_1, only the space 11 in the stack 10 is used, and in general not all of the space 11 will be needed. When task T_CC_1 is activated, the stack pointer is set to the top of precalculated space 11 and task T_ECC_1 then runs in space 12. Any preemptive tasks then running over task T_ECC_1 will then use space 13 in the stack above space 12. Note that when one or more such ordinary preemptive tasks preempt such task T_FCC_1, the stack may go over the bounds of the calculated stack pointer in space 13 to extend the stack to space 14 for another task that may voluntarily yield control of the processor, but only where the running task has higher priority than the task T_ECC_2 that may voluntarily yield control of the processor. In this case the tasks of higher priority than T_ECC_2 will run to completion and so the stack use returns to within space 13 before T_ECC_2 can run. When task T_ECC_2 is activated, the stack pointer is set to the bottom of precalculated stack space 14 and task T_ECC_2 may then run in space 14. Any further preemptive tasks that run over task T_ECC_2 will run in space 15 above space 14.

Figure 4:
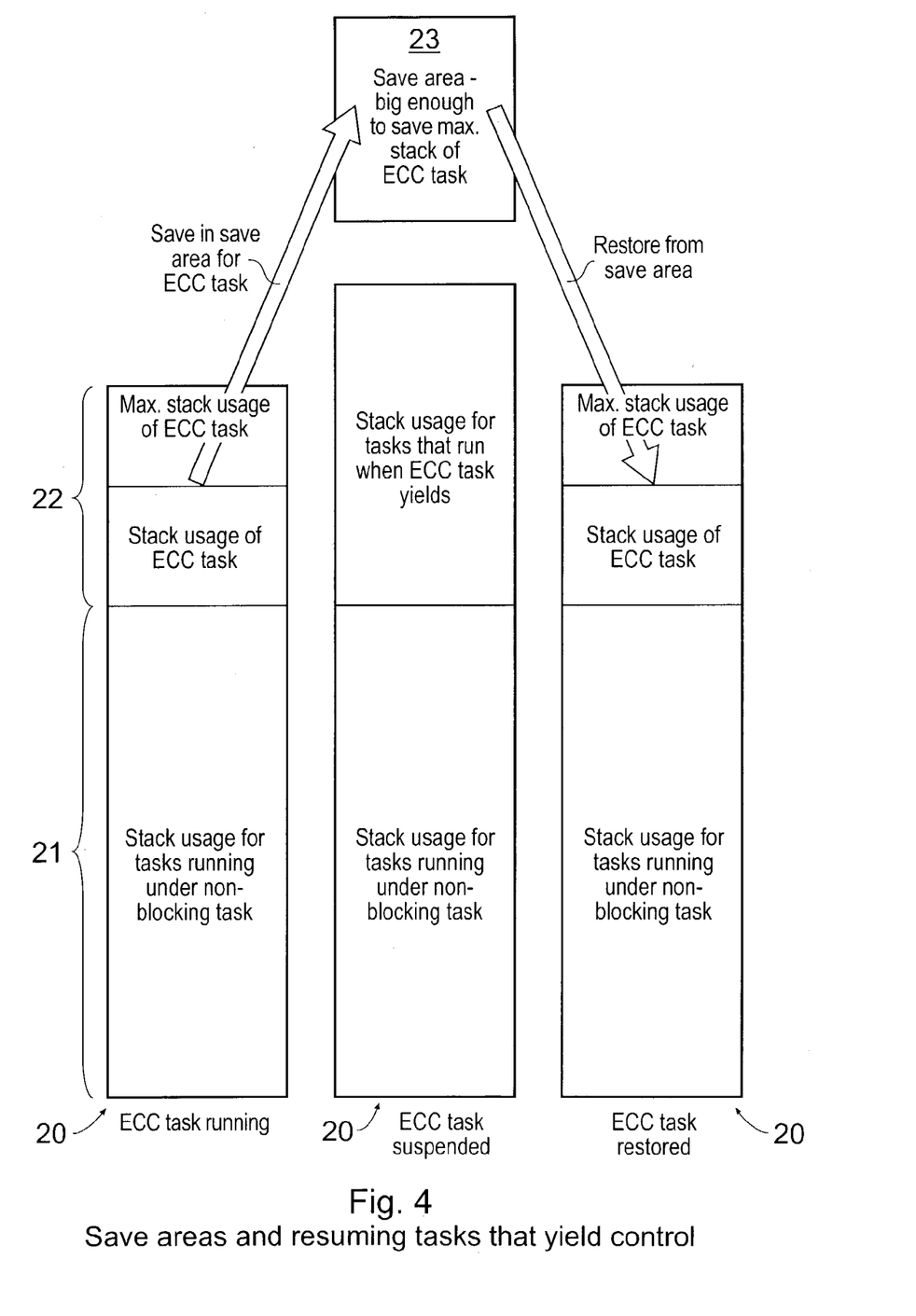
FIG. 4 shows how a task saves its stack area into its "save area", other tasks running instead.

FIG. 4 shows a stack 20 with space 21 reserved for tasks running under a blocking ECC task, for which space 22 is reserved in the stack 20 above space 21. When the ECC task is suspended, it is saved in a separate save area 23 so that higher priority preemptive tasks that ran when the ECC task yields can extend their stack use from space 21 into space 22 because they will complete and subsequently release this space before the ECC task continues. When the ECC task is restored, the contents of the save area 23 are replaced in the stack 20 in space 22.

Figure 5:
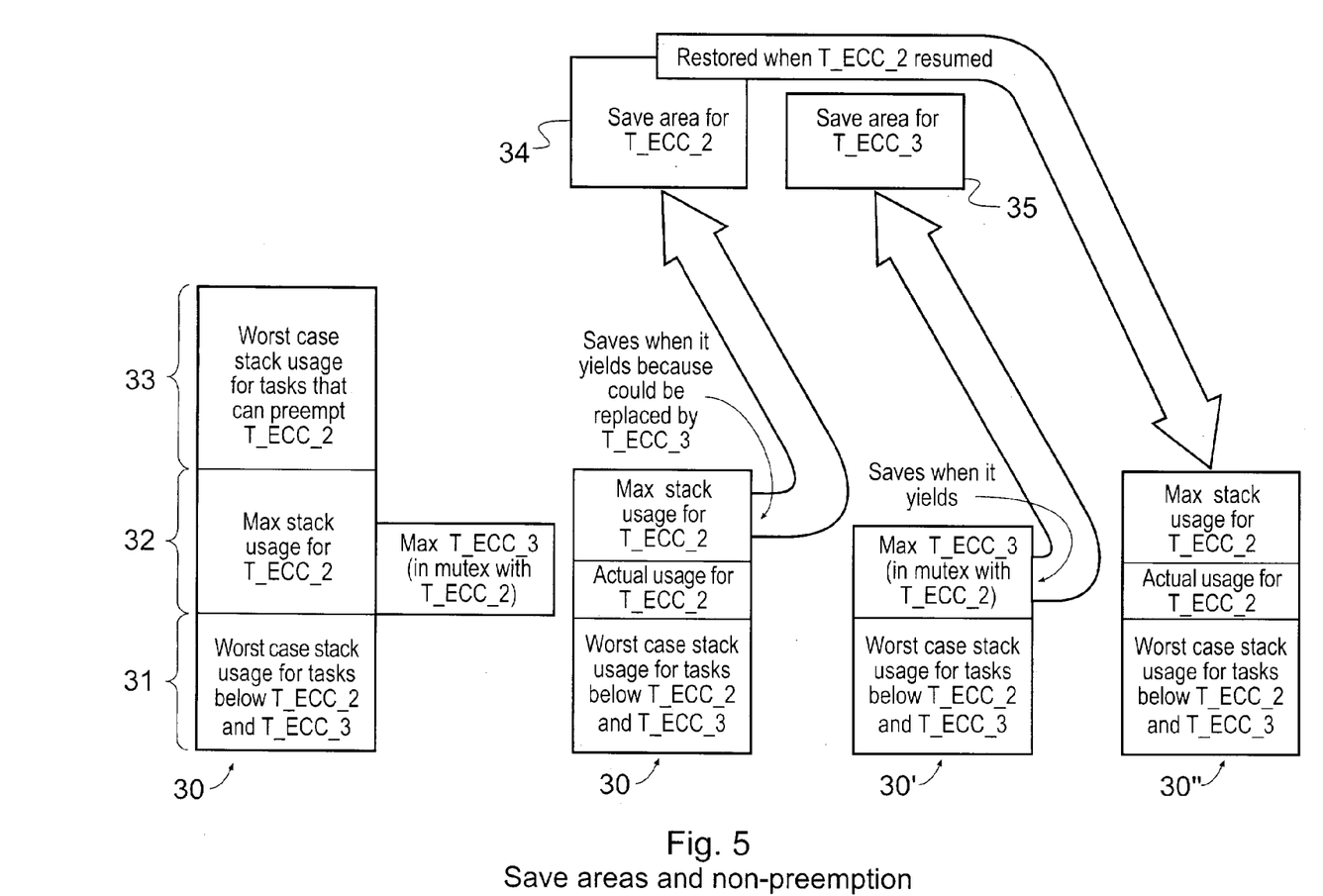
FIG. 5 illustrates an embodiment of the invention in which two tasks that may yield control of the CPU exist in mutual exclusion.

FIG. 5 illustrates an interesting application of an embodiment of the invention in which two tasks T_ECC_2 and T_ECC_3 that may yield control of the CPU exist in mutual exclusion. A stack 30 is shown in which space 31 is reserved at the bottom of the stack for the worst case stack usage of for all tasks running below tasks T_ECC 2 and T_ECC_3. A stack pointer for task T_ECC_2 is set at the top of space 31 and a maximum stack usage for task T_ECC_2 is defined as before to give space 32. Above space 32, there is defined a space 33 for the worst case stack usage for all tasks that can preempt task T_FCC_2. Task T_ECC_3 is defined to be in mutual exclusion (mutex) with task T_ECC_2. Because tasks T_ECC_2 and T_ECC_3 are in mutual exclusion, they can share the same stack space 32. II the present example, the maximum stack usage for task T_ECC_3 is less than that of task T_ECC_2, but it can be seen that the stack pointers for both of these tasks are the same.

When task T_ECC_2 yields control of the CPU, it must be saved (together with any context) in save area 34, because it may be replaced in the stack 30 in space 32 by task T_ECC_3, as shown in stack configuration 30'. When task T_ECC_3 yields control of the CPU, it is saved (together with any context) in a separate save area 35, and task T_ECC_2 and its context can then be restored to the stack from the save area 34 when the task is resumed, as shown in stack configuration 30".

The actual stack pointers for tasks T_ECC_2 and T_ECC_3 are the same, but they have distinct save areas 34, 35. These tasks could yield control to one other in a mutually recursive fashion, yet only use resource equivalent to the larger of the two tasks on the stack 30.

The preferred features of the invention are applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

The invention claimed is:

1. A method of reducing memory and processor usage in a computer operating system utilizing a processor, a memory, and a single stack, comprising:
   providing a processor, a memory, and a single stack;
   dividing a plurality of tasks into predetermined priority categories including preemptive tasks and at least one cooperative task that yields control of the processor to tasks of lower priority than itself;
   associating a stack pointer with each task;
   setting the stack pointer of the at least one cooperative task to a precalculated worst-case value guaranteed to leave sufficient space in the stack beneath the stack pointer for any preemptive task of lower priority;
   allocating an area of memory separate from the single stack for the at least one cooperative task to which its stack contents are saved, wherein a size of the area of memory is determined by a declared precalculated worst-case stack usage of the at least one cooperative task at any point at which the at least one cooperative task may yield control of the processor;
   detecting a need for the at least one cooperative task to yield control of the processor;
   causing the at least one cooperative task to yield control of the processor to a preemptive task having a lower priority than itself; and
   causing the current stack pointer and stack space between the task's known base stack pointer and the current stack pointer value to be saved into the area of memory.

2. A method according to claim 1, further comprising:
   determining the preemptive task is completed;
   causing the stack space to be restored from the area of memory;
   setting the stack pointer to a value corresponding to its previous value before control of the processor was yielded; and
   returning control of the processor to the at least one cooperative task.

3. A method according to claim 1, further comprising, using a space allocated in the stack for preemptive tasks to run the preemptive task having a lower priority than the at least one cooperative task.

4. A method according to claim 3, wherein the space allocated in the stack for preemptive tasks comprises at least a portion of the stack allocated for the at least one cooperative task.

5. A method according to claim 1, wherein:
   said method is executed by executable instructions on a computer readable medium.

6. A method according to claim 5, wherein the executable instructions are stored on at least one of a floppy disk, and optical disk, and a flash memory device.

7. A configuration tool for performing a method of reducing memory and processor usage in a computer operating system by executable instructions comprising:
   providing a processor, a memory, and a single stack;
   dividing a plurality of tasks into predetermined priority categories including preemptive tasks and at least one cooperative task that yields control of the processor to tasks of lower priority than itself;
   associating a stack pointer with each task;
   setting the stack pointer of the at least one cooperative task to a precalculated worst-case value guaranteed to leave sufficient space in the stack beneath the stack pointer for any preemptive task of lower priority;
   allocating an area of memory separate from the single stack for the at least one cooperative task to which its stack contents are saved, wherein a size of the area of memory is determined by a declared precalculated worst-case stack usage of the at least one cooperative task at any point at which the at least one cooperative task may yield control of the processor;
   detecting a need for the at least one cooperative task to yield control of the processor;
   causing the at least one cooperative task to yield control of the processor to a preemptive task having a lower priority than itself; and
   causing the current stack pointer and stack space between the task's known base stack pointer and the current stack pointer value to be saved into the area of memory.

8. A device for reducing memory and processor usage in an operating system utilizing a processor, a memory, and a single stack, the operating system comprising a plurality of tasks divided into predetermined priority categories including preemptive tasks and at least one cooperative task that yields control of the processor to tasks of lower priority than itself, wherein each task comprises a stack pointer, wherein a worst-case stack pointer value for the at least one cooperative task is calculated such that sufficient space remains in the stack beneath the stack pointer of the at least one cooperative task for any preemptive tasks of lower priority than the at least one cooperative task, wherein an area of memory is allocated for the at least one cooperative task to save its contents, and wherein a size of the area of memory comprises sufficient room to store content of the at least one cooperative task at any point at which the at least one cooperative task may yield control of the processor; and
   wherein the current stack pointer and stack space between the task's known base stack pointer and the current stack pointer value are saved into the area of memory when the at least one cooperative task yields control to a preemptive task.

9. A device according to claim 8, wherein the area of memory comprises a declared worst-case stack usage for the at least one cooperative task.

10. A device according to claim 8, wherein the area of memory is separate from the single stack.

11. A device according to claim 8, wherein the preemptive task has a lower priority than the at least one cooperative task.

12. A device according to claim 8, wherein after the preemptive task is completed, the stack space stored in the area of memory is restored to the single stack and the stack pointer is set to its previous value before control of the processor was yielded.

13. A method for reducing memory and processor usage in an operating system utilizing a processor, a memory, and a single stack, comprising:

determining a maximum stack usage for preemptive tasks having a priority lower than a first cooperative task;

allocating space in the single stack large enough to accommodate the determined maximum stack usage for preemptive tasks;

determining stack usage for the first cooperative task;

allocating space in the single stack large enough to accommodate the first cooperative task;

determining a worst-case stack usage for the first cooperative task at any point at which the first cooperative task may yield control of the processor;

allocating an area of memory large enough to accommodate the worst-case stack usage for the first cooperative task;

detecting a need for the first cooperative task to yield control of the processor;

causing the first cooperative task to yield control of the processor to a preemptive task having a lower priority than itself; and causing the current stack pointer and stack space between the task's known base stack pointer and the current stack pointer value to be saved into the area of memory.

14. A method according to claim 13, further comprising:

determining the preemptive task is completed;

causing the stack space to be restored from the area of memory;

setting the stack pointer to a value corresponding to its previous value before control of the processor was yielded; and returning control of the processor to the first cooperative task.

\* \* \* \* \*